United States Patent Office 2,702,804
Patented Feb. 22, 1955

2,702,804

PROCESS FOR THE PREPARATION OF OXAZOLINES

Robert Michel Jacob, Ablon-sur-Seine, France, assignor, by mesne assignments, to Parke, Davis & Company, Detroit, Mich., a corporation of Michigan No Drawing. Application February 23, 1951, Serial No. 212,481

Claims priority, application France February 25, 1950

6 Claims. (Cl. 260—307)

This invention relates to a process for the preparation of certain technically valuable oxazolines.

It is the object of the present invention to provide a new and commercially useful process for the preparation of 2 - dichloromethyl - 4 - p - nitrophenylhydroxymethyl - $\Delta^2$ - oxazoline the conventional formula of which is:

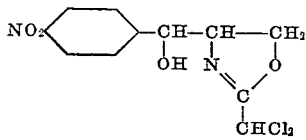

This compound can exist in structural as well as optical isomeric forms. The term "structural," refers to the spatial relationship of the polar groups respectively attached to the two asymmetric carbon atoms. By analogy with the nomenclature adopted by Rebstock et al. (J. A. C. S., vol. 71, pp. 2458-2473) in connection with the diastereoisomeric amido-diol, 2-dichloracetamido-1-p-nitrophenyl-propane 1:3-diol, an isomer of which is known by the common name "chloramphenicol," the structural isomeric forms are herein referred to as "erythro" and "threo" respectively. Both the erythro and the threo forms can exist as racemates of optically active isomers giving a total of six different forms. The foregoing structural formula of conventional type includes, therefore, the complete mixture of all six forms, the racemates of the erythro and threo series and the four individual isomers L-erythro, D-erythro, L-threo and D-threo. It should be noted that the configurational representation of the isomers as D and L bears no relation to the actual sign of the rotation but refers to the configuration about the alpha carbon atom. The D-threo oxazoline isomer has the same configuration with respect to the alpha carbon atom as the therapeutically active isomer of chloramphenicol which has been designated D(-)-threo 2-dichloracetamido-1-p-nitrophenylpropane 1:3-diol.

According to the present invention, the said oxazoline is prepared by the cyclisation of 2-dichloracetamido-1-p-nitrophenyl-3-chloropropane 1-ol of the conventional formula:

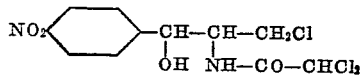

by treatment with a dilute aqueous solution of an alkali metal hydroxide, such as sodium or potassium hydroxide.

Preferably, the reaction is effected by dissolving the propanol in a water-miscible inert organic solvent such as ethanol, adding to the solution a dilute aqueous solution of an alkali metal hydroxide conveniently a solution of sodium or potassium hydroxide having a normality lying between about 1 and about 4, and allowing the reaction mixture to stand at about room temperature until the reaction is completed, when the desired product crystallises out and can be separated by conventional methods.

The aforesaid propanol contains, of course, two asymmetric carbon atoms and can exist in erythro and threo forms. Since the process of the invention does not involve epimerisation, the erythro chloropropanol epimer or the threo chloropropanol epimer is chosen as starting material if the desired product is the erythro or threo oxazoline respectively. The propanol may be obtained from α - dichloracetamido - β - hydroxy - p - nitro - propiophenone (U. S. Patent No. 2,515,239) by reacting with thionyl chloride to produce α-dichloracetamido - β - chlor - p - nitropropiophenone and then reducing with aluminum isopropylate in isopropyl alcohol to obtain 2 - dichloracetamido - 1 p - nitrophenyl - 3 - chloro - propane - 1 - ol as described in the specification of my co-pending application Serial No. 212,482, filed on even date herewith.

In one preferred embodiment of the invention, the starting material is either the DL- erythro or the DL-threo propanol of the foregoing formula, yielding the corresponding DL- erythro or DL- threo oxazoline.

A commercially important route to the DL- threo oxazoline which is of particular importance comprises treating DL- erythro 2-dichloracetamido-1-p-nitrophenyl-3-chloropropane 1-ol, with concentrated sulphuric acid, basifying the resultant solution with dilute ammonium hydroxide and treating the resultant DL- threo 2-dichloracetamido-1-p-nitrophenyl-3-chloropropane 1-ol with a dilute aqueous solution of an alkali metal hydroxide.

The said oxazolines are valuable intermediates for the production of chloramphenicol and the DL- mixture of which it is the D- component. This can be accomplished by dissolving the oxazoline in dilute hydrochloric acid at a temperature of 50° C. or below followed by neutralization with aqueous ammonia in the cold to obtain a 2 - dichloracetamido - 1 - p - nitrophenylpropane - 1,3 - diol as described in the application of Ronald Slack 199,937, filed December 8, 1950. The DL- threo oxazoline is also of direct therapeutic interest in that it possesses antibiotic activity.

The following examples show, without imposing limitation, how the invention may be put into practice.

Example I 2.68 g. of DL-erythro 2-dichloracetamido - 1 - p - nitrophenyl - 3 - chloro - propane 1 - ol, M. P.=133–134° C., are dissolved in 23 cc. of ethyl alcohol, and 8 cc. of a normal solution of sodium hydroxide are added. The mixture is allowed to stand for 2 hours at ordinary temperature, and the product which crystallises is filtered, washed with alcohol to give, after drying in an oven at 100° C., 1.85 g. of DL-erythro 2-dichloromethyl-4-p-nitrophenylhydroxymethyl - $\Delta^2$ - oxazoline, M. P.= 167–168° C.

Example II

Following the method of Example I starting with 3.1 g. of DL-threo 2-dichloracetamido-1-p-nitrophenyl-3-chloro-propane 1-ol, M. P.=135–136° C., but with 10 cc., instead of 8 cc., of a normal solution of sodium hydroxide, 2.3 g. of DL-threo 2-dichloromethyl-4-p-nitrophenylhydroxymethyl-$\Delta^2$-oxazoline are obtained, melting, after recrystallisation from absolute alcohol, at 160–161° C.

I claim:

1. A process for the preparation of an oxazoline having the formula:

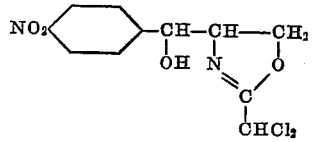

which comprises the cyclisation of 2-dichloracetamido-1-p-nitrophenyl-3-chloro-propane 1-ol by treatment with a dilute aqueous solution of an alkali metal hydroxide.

2. A process as claimed in claim 1 wherein the reaction is effected by dissolving the propanol in a water-miscible inert organic solvent, adding to the solution a dilute aqueous solution of an alkali metal hydroxide and allowing the reaction mixture to stand at a temperature not substantially greater than room temperature until the reaction is completed.

3. A process for the preparation of DL-threo 2-dichloromethyl - 4 - p - nitrophenylhydroxymethyl - $\Delta^2$ - oxazoline which comprises the cyclisation of DL-threo 2 - dichloroacetamido - 1 - p -nitrophenyl - 3 - chloro - propane 1 - ol by treatment with a dilute aqueous solution of an alkali metal hydroxide.

4. A process for the preparation of DL- erythro 2 - dichloromethyl - 4 - p - nitrophenylhydroxymethyl - $\Delta^2$ - oxazoline which comprises the cyclisation of DL- erythro 2 - dichloracetamido - 1 - p - nitrophenyl - 3 - chloropropane 1 - ol by treatment with a dilute aqueous solution of an alkali metal hydroxide.

5. A process for the preparation of DL- threo 2 - di - chloromethyl - 4 - p - nitrophenylhydroxymethyl - $\Delta^2$ - oxazoline which comprises dissolving DL- threo 2 - di - chloracetamido - 1 - p - nitrophenyl - 3 - chloropropane 1 - ol in a water-miscible inert organic solvent, adding to the solution a dilute aqueous solution of an alkali metal hydroxide and allowing the reaction mixture to stand at a temperature not substantially greater than room temperature until the reaction is completed.

6. A process for the preparation of DL- erythro 2 - di - chloromethyl - 4 - p - nitrophenylhydroxymethyl - $\Delta^2$ - oxazoline which comprises dissolving DL- erythro 2 - di - chloracetamido - 1 - p - nitrophenyl - 3 - chloropropane 1 - ol in a water-miscible inert organic solvent, adding to the solution a dilute aqueous solution of an alkali metal hydroxide and allowing the reaction mixture to stand at a temperature not substantially greater than room temperature until the reaction is completed.

References Cited in the file of this patent
UNITED STATES PATENTS

| | | |
|---|---|---|
| 2,114,326 | Adams | Apr. 19, 1938 |
| 2,513,346 | Moersch et al. | July 4, 1950 |

OTHER REFERENCES

Leffler, "J. Am. Chem. Soc.," vol. 59 (1937) pp. 2252–8.

Wiley et al., "Chem. Reviews," vol. 44, June, 1949, pp. 449–51.

Bergman, "Z. Physiol Chem.," vol. 137 (1924), pp. 27–46.